(12) United States Patent
Chalaud et al.

(10) Patent No.: US 11,156,114 B2
(45) Date of Patent: Oct. 26, 2021

(54) TURBOMACHINE PROVIDED WITH A VANE SECTOR AND A COOLING CIRCUIT

(71) Applicant: SAFRAN AIRCRAFT ENGINES, Paris (FR)

(72) Inventors: Sébastien Chalaud, Moissy-cramayel (FR); Christian Vessot, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 380 days.

(21) Appl. No.: 15/563,188

(22) PCT Filed: Mar. 31, 2016

(86) PCT No.: PCT/FR2016/050728
§ 371 (c)(1),
(2) Date: Sep. 29, 2017

(87) PCT Pub. No.: WO2016/156743
PCT Pub. Date: Oct. 6, 2016

(65) Prior Publication Data
US 2018/0087392 A1    Mar. 29, 2018

(30) Foreign Application Priority Data

Apr. 1, 2015 (FR) .................................. 1552802

(51) Int. Cl.
*F01D 9/04* (2006.01)
*F02C 7/06* (2006.01)
(Continued)

(52) U.S. Cl.
CPC .............. *F01D 9/041* (2013.01); *F01D 9/02* (2013.01); *F01D 9/04* (2013.01); *F02C 7/06* (2013.01);
(Continued)

(58) Field of Classification Search
CPC .......... F05D 2220/323; F05D 2260/213; F01D 9/041; F01D 9/02; F01D 9/04; F01D 25/18; F02C 7/06; F02C 7/14; Y02T 50/676
(Continued)

(56) References Cited

U.S. PATENT DOCUMENTS 2,474,258 A * 6/1949 Kroon .................. F01D 25/162
415/175
4,645,415 A    2/1987 Hovan et al.
(Continued)

FOREIGN PATENT DOCUMENTS

CN        101178014      5/2008
EP        0743435 A1    11/1996
(Continued)

OTHER PUBLICATIONS

Leyko, Matthieu, Stator Vane Sector of a Turbomachine comprising Hot Fluid Circulation Channels—Google Translation of FR 3028576 A1, 2014, Google Patents, 6 Pages. (Year: 2014).*
(Continued)

Primary Examiner — Michael L Sehn
(74) Attorney, Agent, or Firm — Bookoff McAndrews, PLLC

(57) ABSTRACT

A turbomachine including at least one stator vane sector (10) and a fluid distribution circuit (22), the stator vane sector comprising at least one vane (12), a fluid inlet (25*a*), a fluid outlet (25*b*), and a channel (24*a*) providing fluid flow connection between the fluid inlet and the fluid outlet while extending at least in part in the vane (12), the vane and the channel being adapted, to enable heat to be exchanged between a hot fluid passing through the channel and a stream of cold air passing through the vane sector, the fluid distribution circuit (22) presenting a feed pipe (22*a*) and a
(Continued)

recovery pipe (22b), the fluid inlet (25a) being in fluid flow connection with a branch tapping (23a) of the feed pipe (22a) while the fluid outlet (25b) is in fluid flow connection with a branch tapping (23b) of the recovery pipe (22b).

20 Claims, 6 Drawing Sheets

(51) Int. Cl.
    *F02C 7/14* (2006.01)
    *F01D 9/02* (2006.01)
    *F01D 25/18* (2006.01)

(52) U.S. Cl.
    CPC ............... *F02C 7/14* (2013.01); *F01D 25/18* (2013.01); *F05D 2220/323* (2013.01); *F05D 2260/213* (2013.01); *Y02T 50/60* (2013.01)

(58) Field of Classification Search
    USPC ........................................................ 415/115
    See application file for complete search history.

(56) References Cited

U.S. PATENT DOCUMENTS

| | | |
|---|---|---|
| 5,782,076 A | 7/1998 | Huber et al. |
| 6,132,173 A | 10/2000 | Tomita et al. |
| 2012/0243970 A1* | 9/2012 | Hellgren ................ F01D 5/187 |
| | | 415/1 |

FOREIGN PATENT DOCUMENTS

| | | | |
|---|---|---|---|
| EP | 1630358 A2 | 3/2006 | |
| EP | 1884625 A2 | 2/2008 | |
| FR | 3028576 A1 * | 5/2016 | ............ F01D 9/041 |
| JP | H10280908 | 10/1998 | |
| WO | 2013150248 A1 | 10/2013 | |

OTHER PUBLICATIONS

Suga, JPH10280908A English Translation, 1998 (Year: 1998).*
International Search Report dated Jun. 17, 2016, in International Application No. PCT/FR2016/050728 (3 pages).
English language Translation of Chinese Office Action in corresponding Chinese Application No. 201680021255.3, dated Jan. 3, 2019 (5 pages).
Search Report issued in corresponding Chinese Application No. 201680021255.3, dated Dec. 27, 2018 (2 pages).

* cited by examiner

TURBOMACHINE PROVIDED WITH A VANE SECTOR AND A COOLING CIRCUIT

CROSS-REFERENCE TO RELATED APPLICATION(S)

This application is the U.S. national phase entry under 35 U.S.C. § 371 of International Application No. PCT/FR2016/050728, filed on Mar. 31, 2016, which claims priority to French Patent Application No. 1552802, filed on Apr. 1, 2015, the entireties of which are herein incorporated by reference.

FIELD OF THE INVENTION

The present invention relates to the field of turbomachines fitted with a cooling circuit, and particularly but not exclusively a cooling circuit for cooling the oil of the turbomachine. In particular, the invention relates to cooling circuits in which heat exchange takes place in full or in part in stator vanes of the turbomachines.

The term "turbomachine" is used to cover any gas turbine apparatus for producing drive power, including in particular turbojets providing thrust needed for propulsion by ejecting hot gas at high speed, and turboshaft engines where the drive power is delivered by rotation of a drive shaft. For example, turboshaft engines are used as engines in helicopters, ships, trains, or indeed as industrial engines. Turboprops (a turboshaft engine driving a propeller) are likewise turboshaft engines used as aeroengines.

STATE OF THE PRIOR ART

The oil circuit of an aeroengine performs two tasks, one of lubricating the rotary portions of the engine, and another of removing the heat given off inside the engine. Various types of heat exchanger already exist in order to cool oil, which, for reasons of efficiency, generally needs to be at a temperature that must not exceed a predetermined temperature.

Some heat exchangers use air as the cold source. For example, patent document WO 2013/150248 A1 describes a stator vane for a turbomachine that is made up of a plurality of portions arranged relative to one another so as to define air flow passages between those portions. Oil that is to be cooled flows in channels formed in the various vane portions. Although satisfactory, that solution is relatively complex.

Furthermore, in order to optimize known cooling circuits, it is desired particularly, but not exclusively, to reduce head losses in the oil circuit.

SUMMARY OF THE INVENTION

The present disclosure relates to a turbomachine including at least one stator vane sector and a fluid distribution circuit, the stator vane sector comprising at least one vane, a fluid inlet, a fluid outlet, and a channel providing fluid flow connection between the fluid inlet and the fluid outlet while extending at least in part in the vane, the vane and the channel being adapted, while the turbomachine is in operation, to enable heat to be exchanged between a hot fluid passing through the channel and a stream of cold air passing through the stator vane sector, the fluid distribution circuit presenting at least one feed pipe and at least one recovery pipe distinct from the feed pipe, the fluid inlet being in fluid flow connection with a branch tapping of the feed pipe while the fluid outlet is in fluid flow connection with a branch tapping of the recovery pipe.

By way of example, the hot fluid for cooling is oil. Under such circumstances, the feed pipe may be connected to a pump of a lubrication circuit of the turbomachine, which pump is designed to discharge into the feed pipe hot oil that has been collected after lubricating the rotary portions of the engine. The recovery pipe may be connected to a tank of the lubrication circuit so as to return oil to the tank after it has been cooled by passing through at least one stator vane sector.

The term "stator vane sector" is used to designate a portion of a stator vane set of a turbomachine. This portion comprises some number of vanes and, by way of example, but not necessarily, it is defined internally and externally by plates (also referred to as "platforms" or "walls") that extend in the circumferential direction of the vane set and that interconnect the inner or outer ends of the vanes. The number of vanes in a vane sector is greater than or equal to one and less than or equal to the total number of vanes in the set.

In general manner, in the present disclosure, the axial direction corresponds to the direction of the axis of rotation of the rotor of the turbomachine, while a radial direction is a direction perpendicular to this axis. Likewise, an axial plane is a plane containing the axis of rotation of the rotor and a radial plane is a plane perpendicular to this axis. The circumferential direction corresponds to the direction of the circumference of the stator vane set of the turbomachine.

Furthermore, unless specified to the contrary, the adjectives "internal" and "external" or "inner" and "outer" are used relative to a radial direction such that an inner portion (i.e. a radially inner portion) of an element is closer to the axis of rotation than an outer portion (i.e. a radially outer portion) of the same element.

Finally, unless specified to the contrary, "upstream" and "downstream" are defined relative to the normal flow direction of the fluid (from upstream to downstream) between the vanes of the stator.

It can be understood that a turbomachine has one or more stator vane sectors (unless specified to the contrary, referred to below more simply as "vane sectors") and that each vane sector has one or more vanes. One or more of these vane sectors has at least one respective fluid inlet (unless specified to the contrary, referred to below more simply as an "inlet"), at least one respective fluid outlet (unless specified to the contrary, referred to below more simply as an "outlet"), and at least one respective channel. In each vane sector that has a channel, the channel extends at least in part in at least one vane and provides fluid flow connection between the inlet and the outlet of the vane sector. Naturally, each of the channels, and each of the vanes containing one or more such channels, are configured to be able to exchange heat between a hot fluid flowing in the channel(s) and a cold air stream flowing through the stator vane sector(s).

It can be understood that the channel connects the inlet to the outlet. Naturally, it is possible to have a single channel that extends between one or more inlets and one or more outlets. Conversely, it is possible to have a plurality of channels, each connected to a single inlet and/or to a single outlet. In yet another variant, there may be as many inlets and outlets as there are channels. When there are a plurality of channels, the channels may extend in a single vane or in a plurality of distinct vanes. For example, there may be a single channel per vane. Naturally, each channel may be subdivided into subchannels. In another example, there may be a single channel that extends in a plurality of vanes. Naturally, this is applicable to each vane sector.

Below, and unless specified to the contrary, the term "the" vane sector/vane/inlet/outlet/channel, should be understood as "at least one" or the vanes sectors/vanes/inlets/outlets/channels.

Furthermore, the terms "hot" and "cold" should be considered relative to each other, the fluid being hotter than the air and the air being colder than the fluid.

Below, the term "air" covers any gas that might be used as oxidizer in the turbomachine. In general manner, the exchange of heat between the hot fluid and the cold air stream depends on the distance between the first channel and the surface of the plate over which the cold air stream passes, and also on thermal conduction through the material constituting the vane. For example, the vane may be made of a metal or a metal alloy that has good thermal conductivity.

It can be understood that the inlet, the outlet, and the channel form a branch circuit relative to the fluid distribution circuit. In other words, the branch circuit comprises an inlet, an outlet, and the channel(s) extending between the inlet and the outlet. Naturally, when a single channel connects a plurality of inlets with a plurality of outlets, the branch circuit then comprises all of those inlets and outlets together with the channel that extends between those inlets and outlets. Thus, hot fluid flows in the distribution circuit and a portion of this hot fluid is directed into the vane, on a branch from the distribution circuit. When the vane set has a plurality of branch circuits in parallel, each vane sector may have one or more branch circuits, each of these branch circuits conveying some of the hot fluid to one or more vanes in order to cool the hot fluid. Such a structure makes it possible to cool the hot fluid effectively while minimizing head losses in the cooling circuit as a whole, the cooling circuit comprising the distribution circuit and the branch circuit(s). Furthermore, compared with a series cooling circuit, the parallel branch circuits serve to maximize the temperature difference between the hot fluid and the cold air so that the cooling in each channel is maximized. Furthermore, when there are a plurality of branch circuits in parallel, in the event of one branch circuit failing, e.g. as a result of a vane being broken, the hot fluid continues to be cooled at least in part by the other branch circuits.

In some embodiments, the stator vane sector comprises an inner plate connected to the inner end of the vane and an outer plate connected to the outer end of the vane, the fluid inlet and the fluid outlet both being arranged in one of the plates selected from the inner plate and the outer plate, while the channel extends in part in the other plate from among the inner plate and the outer plate.

It can thus be understood that relative to the vane, the inlet and the outlet are arranged on a single side, both in the same plate, while the channel extends in the vane and in the opposite plate. Naturally, the opposite plate and the channel are adapted, while the turbomachine is in operation, to enable heat to be exchanged between a hot fluid flowing through the channel and a cold air stream flowing through the stator vane sector. Such a structure serves to improve the cooling of the fluid flowing in the channel, since under such circumstances the heat exchange areas are situated not only in the vane but also in the inner plate and/or the outer plate.

The arrangement of the inlet and the outlet of a branch circuit on the same side of a plate, and on the same side as the fluid distribution circuit relative to the air passage passing through the stator vane sector, can be advantageous in particular when the fluid distribution circuit is connected to an turbomachine lubrication circuit arranged on the same side relative to the air passage. Specifically, the fluid flow connections between said inlets and outlets and the fluid distribution circuit, and also the fluid flow connections between said distribution circuit and the lubrication circuit then have no need to pass through the air passage. Nevertheless, it is entirely possible, without going beyond the ambit of the invention, to make provision for at least one such fluid flow connection to pass through the air passage, e.g. by passing via a service arm that is separate from the vane sectors.

In some embodiments, the channel extends from the fluid inlet radially in a first vane, circumferentially in a plate over the entire circumferential extent of the vane sector, and then once more radially in the first vane towards the fluid outlet.

It can thus be understood that the channel forms a loop between the inlet and the outlet, the loop having a "go" passage and a "return" passage in a single vane, i.e. the first vane, and extending over the entire circumferential extent of the plate that is opposite from the plate in which the inlet and the outlet are arranged. Naturally, when the vane sector has a plurality of vanes, the channel may also extend radially in one or more vanes other than the first vane. Such a configuration makes it possible to optimize the heat exchange areas and also to optimize temperature balancing within the vane sector because of the proximity of the "go" passes and the "return" passes.

In some embodiments, the stator vane sector has a plurality of vanes, the channel extending from the fluid inlet, radially in a first vane, circumferentially in a plate over the entire circumferential extent between vanes, then once more radially in the first vane towards the fluid outlet.

It can thus be understood that the channel forms a loop between the inlet and the outlet, this loop presenting a "go" passage and a "return" passage in a single vane, i.e. the first vane, and extending over the entire circumferential extent of the plate that is opposite from the plate in which the inlet and the outlet are arranged, between the first vane and a second vane adjacent to the first vane (i.e. the extent between vanes). Naturally, such a channel associated with a fluid inlet and a fluid outlet may be provided for each vane of the vane sector. Such a configuration serves to optimize the heat exchange areas and to balance temperatures within the vane sector because of the proximity of the "go" passes and the "return" passes. Furthermore, very great safety is provided for the cooling circuit in the event of a leak: it is possible to isolate a leaky channel, e.g. by closing isolating valves arranged at the fluid inlet and the fluid outlet that are associated with the channel, while retaining large cooling capacity because of the other channels that are intact.

In some embodiments, the fluid inlet and the fluid outlet are arranged in the inner plate. This serves to simplify the general structure of the cooling circuit, e.g. when it is used for cooling oil in the turbomachine, since the devices in the turbomachine that use oil are generally located radially inside relative to the vane sector.

In some embodiments, the stator vane sector has a plurality of vanes, the channel extending in at least two of the vanes. In a variant, the stator vane sector has an inner plate connected to the inner end of each of the vanes and an outer plate connected to the outer end of each of the vanes, the channel extending in the inner plate and in the outer plate.

Such configurations using both the inner plate and the outer plate for incorporating the cooling channel serve to further improve the exchange of heat between the hot fluid and the cold air when the hot fluid passes in the channel. Specifically, practically all of the surface area of a stator vane sector swept by the cold air passing through the stator vane set can be used as a heat exchange area.

In some embodiments, the channel has the same number of passages in each of the vanes, each passage possibly being formed by a subchannel or by one pass of said channel. In some embodiments, the channel extends over the same linear length in each of the vanes. Naturally, the linear length of the channel in a vane corresponds to the sum of the lengths of each of the passages. Singly or in combination, such structures serve to reduce temperature differences within each vane.

In some embodiments, the vane sector has a plurality of vanes, at least two vanes each having a respective channel, the vanes and the channels being adapted, when the turbomachine is in operation, to enable heat to be exchanged between a hot fluid flowing through the channel and a cold air stream flowing through the stator vane sector, the channel of one vane being distinct from the channel of the other vane, the vane sector having as many fluid inlets and fluid outlets as it has channels, each channel being respectively in fluid flow connection with a fluid inlet and with a fluid outlet that are distinct from the fluid inlet and the fluid outlet of the other channel.

In other words, it can be understood that a first channel extends in a first vane and that a second channel extends in a second vane. In a variant, a third channel extends in a third vane, etc. Each channel is independent of the other channels, the inlet and the outlet of each channel being different from the inlets and the outlets of the other channels. Naturally, each channel may present one or more inlets and one or more outlets. Each channel and the vane in which it is arranged are adapted, while the turbomachine is in operation, to enable heat to be exchanged between a hot fluid passing through the channel and a cold air stream passing through the stator vane sector. Naturally, another channel, distinct from the first, second, etc. channels, may extend in one or more vanes, e.g. in the first vane and in the second vane, or indeed in distinct vanes.

It can also be understood that each inlet/outlet is connected to a respective branch tapping of the feed/recovery pipe. For example, the feed/recovery pipes have as many respective branch tappings as the vane sector has inlets/outlets.

In a variant, each vane has a channel, each channel of a vane being distinct from the channels of the other vanes, the vane sector having as many fluid inlets and fluid outlets as channels, each channel being in fluid flow connection with a respective inlet and a respective outlet that are distinct from the inlet and the outlet of the other channel.

Naturally, if there are a plurality of vane sectors, the above configurations may be applied to each of the vane sectors. For example, in a variant, each vane of each vane sector may include a channel in fluid flow connection with an inlet and with an outlet, as described above.

Such a structure makes it possible to form as many branch circuits as the vane sector(s) has/have vanes.

Such configurations make it possible to form a large number of independent branch circuits, thereby improving the cooling of the hot fluid without correspondingly increasing head loss within the cooling circuit.

In some embodiments, the turbomachine has at least two stator vane sectors, each stator vane sector having at least one vane, a fluid inlet, a fluid outlet, and a channel providing fluid flow connection between the fluid inlet and the fluid outlet while extending at least in part in the vane, the vane and the channel of each of the vane sectors being adapted, when the turbomachine is in operation, to enable heat to be exchanged between a hot fluid flowing through each channel and a cold air stream flowing through the stator vane sector, the fluid inlet of each stator vane sector being in fluid flow connection with a branch tapping of the feed pipe, while the fluid outlet of each stator vane sector is in fluid flow connection with a branch tapping of the recovery pipe.

It can be understood that there are at least as many branch circuits as there are vane sectors, each vane sector having at least one branch circuit. Naturally, each vane sector may have only one or else a plurality of vanes, while each branch circuit may extend in only one vane or in a plurality of vanes, in one or both plates, if any, of the vane sector in question, etc.

Such configurations make it possible to form a large number of independent branch circuits, thereby improving the cooling of the hot fluid without correspondingly increasing head loss within the cooling circuit.

In some embodiments, the feed pipe forms a first feed pipe while the channel, the fluid inlet, and the fluid outlet form respectively a first channel, a first fluid inlet, and a first fluid outlet, the distribution circuit comprising a second feed pipe, the flow direction of the fluid in the first feed pipe being opposite to the flow direction of the fluid in the second feed pipe, while the stator vane sector includes a second fluid inlet, a second fluid outlet, and a second channel providing fluid flow connection between the second fluid inlet and the second fluid outlet while extending at least in part in the vane, the vane and the second channel being adapted, when the turbomachine is in operation, to allow heat to be exchanged between a hot fluid flowing through the second channel and a cold air stream flowing through the stator vane sector, the second fluid inlet being in fluid flow connection with a branch tapping of the second feed pipe, while the second fluid flow outlet is in fluid flow connection with a branch tapping of the recovery pipe.

In a variant, the recovery pipe forms a first recovery pipe while the distribution circuit has a second recovery pipe, the flow direction of the fluid in the first recovery pipe being opposite to the flow direction of the fluid in the second recovery pipe, the first outlet being in fluid flow connection with a branch tapping of the first recovery pipe while the second outlet is in fluid flow connection with a branch tapping of the second recovery pipe. Naturally, the distribution circuit may have a single feed pipe and two recovery pipes, two feed pipes and a single recovery pipe, or indeed two feed pipes and two recovery pipes.

For example, the feed pipe extends circumferentially while the flow direction of the fluid within the feed pipes are opposite in the circumferential direction. Such configurations make it possible to make the overall temperature of components along the feed and/or recovery pipes more uniform, thereby reducing mechanical stresses that result from local temperature differences.

In some embodiments, the stator vane sector has an inner plate connected to the inner end of the vane and an outer plate connected to the outer end of the vane, the fluid distribution circuit being arranged at least in part in one of the plates from among the inner plate and the outer plate.

This serves to cool the hot fluid while it is flowing in the portion of the distribution circuit that is arranged in the plate.

In some embodiments, the branch tapping of the feed pipe and/or the branch tapping of the recovery pipe is/are provided with an isolating valve.

Naturally, when a vane sector presents a plurality of inlets/outlets, it may have one valve per inlet and one valve per outlet, or else an inlet manifold may be arranged upstream in the fluid flow direction of the inlet and another manifold may be arranged downstream of the outlet (upstream and downstream being considered relative to the flow direction of the fluid in the channel), with a single isolating valve being arranged at the inlet of the inlet manifold and/or at the outlet of the outlet manifold. It is thus possible to obtain fluid flow isolation respectively for all or part of the vane sector, or only for all of the vane sector. By way of example, this can serve to limit considerably the loss of fluid in the event of a channel breaking in a vane sector.

In some embodiments, the fluid is a liquid, in particular oil.

In some embodiments, the fluid is a heat transfer fluid, the distribution circuit including a heat exchanger configured to exchange heat between the heat transfer fluid and another fluid, in particular oil.

In some embodiments, the vanes are outlet guide vanes (OGVs). In particular, they may be vanes for guiding the bypass flow of air that are arranged in an outlet passage for the fan in a bypass turbojet. Such a passage for passing the bypass air stream is commonly referred to as a bypass passage.

Using existing surfaces constituted by the surfaces of the vanes themselves and possibly of the inner and/or outer plates as heat exchange surfaces presents the advantage of not increasing aerodynamic drag in comparison with a distinct heat exchanger projecting into the air passage, where such a distinct heat exchanger would give rise to additional aerodynamic drag and consequently to an additional loss of aerodynamic thrust.

Furthermore, for an airplane engine and when the vanes are outlet guide vanes placed in the bypass passage, the transfer of heat from the hot fluid to the air delivers additional energy to the bypass flow, which is beneficial for the performance of the engine. Furthermore, this delivery of heat takes place over the entire extent of the passage in the radial direction, referred to below as the "radial height" of the passage, thereby making this solution more efficient thermodynamically than most known solutions.

BRIEF DESCRIPTION OF THE DRAWINGS

The invention and its advantages can be better understood on reading the following detailed description of various embodiments of the invention given as non-limiting examples. The description refers to the accompanying sheets of figures, in which.

DETAILED DESCRIPTION OF EMBODIMENTS

For reasons of clarity and concision, it should be understood that the figures are very diagrammatic representations. The person skilled in the art will have no difficulty in understanding that the teaching of the present description applies to all forms and variants of a turbomachine stator vane sector.

Figure 1:
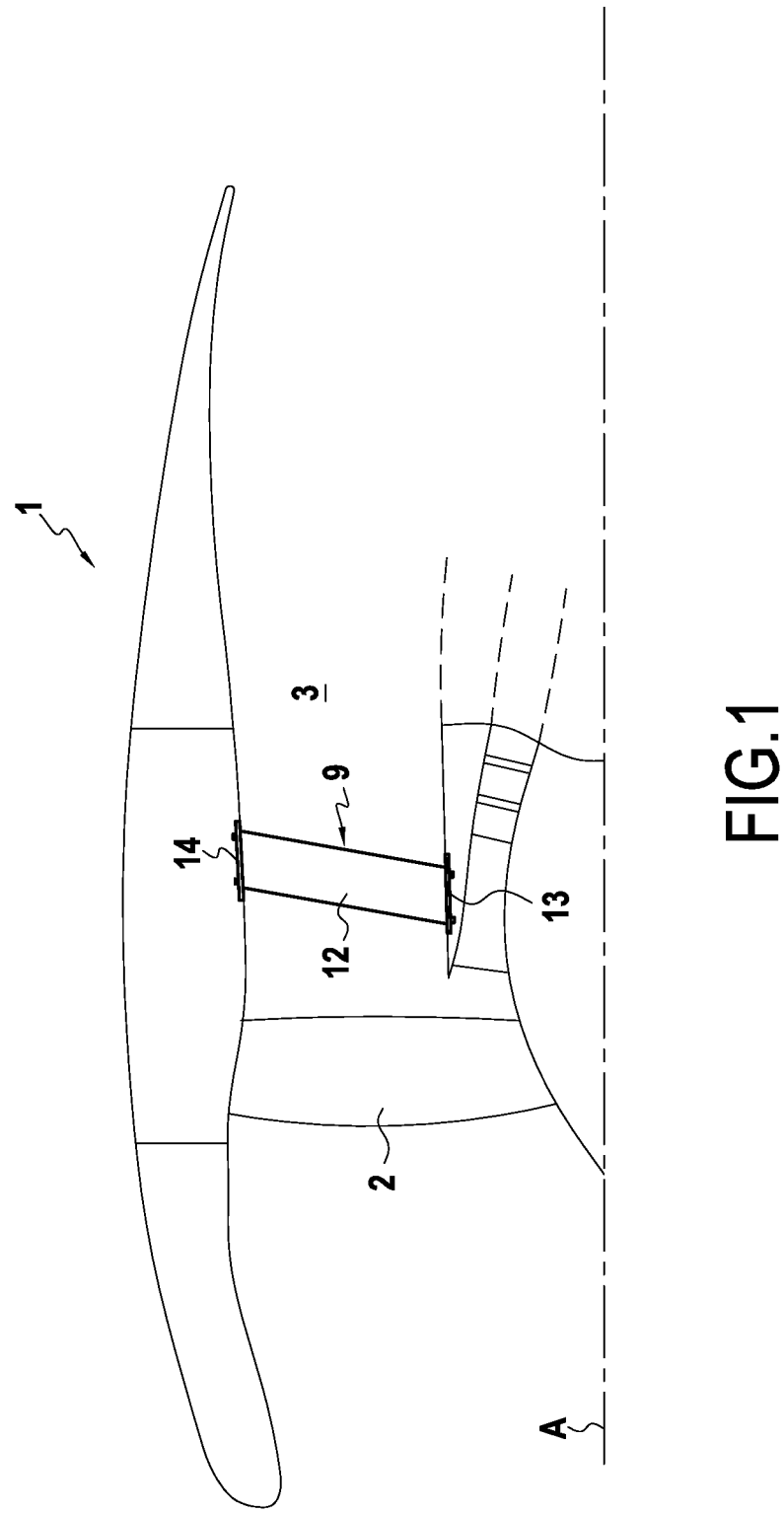
FIG. 1 is an axial half-section of an example airplane turbojet.

FIG. 1 is an axial half-section of the upstream portion of a turbomachine 1, in this example a two-spool bypass airplane turbojet. A stator vane set 9 is arranged downstream from the fan 2 of the turbojet 1 in the bypass air stream 3. The stator vane set 9 comprises an inner annular wall 13 and an outer annular wall 14 having outlet guide vanes (OGVs) 12 extending between them. These vanes 12 are regularly distributed around the axis of rotation A of the turbojet rotor. The inner and outer annular walls 13 and 14 are generally cylindrical about the axis A.

In an embodiment, the stator vane set 9 is made up of a plurality of stator vane sectors or modules that are connected together end to end, each vane sector comprising at least one vane and extending over an angular sector of the vane set. All of the vane sectors may be identical, but that is not essential. Some or all of the vane sectors may be used as heat exchangers. By way of example, the heat exchanger vane sectors may be of the same type as those described below.

Figure 2:
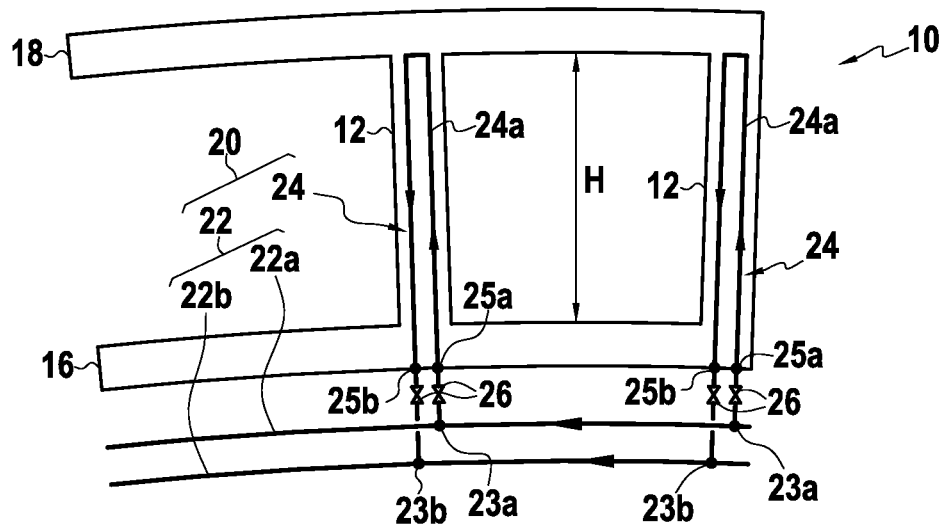
FIG. 2 is a simplified representation of a first embodiment of a vane sector.

In the example of FIG. 2, the vane sector or module 10 comprises two vanes 12 extending radially between an inner plate 16 and an outer plate 18. The inner plate 16 extends circumferentially between the inner ends of the vanes 12 and beyond one of these ends, while the outer plate 18 extends circumferentially between the outer ends of the vanes 12 and beyond one of these ends, in the same direction as the inner plate 16 and over the same angular extent in the circumferential direction. When the vane sector 10 is integrated in the stator vane set 9, the inner and outer plates 16 and 18 respectively form portions of the inner and outer annular walls 13 and 14. The inner plate 16 may be fastened to an annular wall of a hub casing that defines internally a portion of the passage for the bypass stream. The outer plate 18 may be fastened on an annular wall of a fan casing that defines externally the same portion of the passage for the bypass stream.

A cooling circuit 20, in this example for cooling the oil of the turbojet as its hot fluid, comprises a distribution circuit 22 and a plurality of branch circuits 24. The distribution circuit 22 comprises a feed pipe 22a and a recovery pipe 22b. In this first embodiment, each branch circuit 24 comprises a channel 24a that extends in a single vane 12 over the entire radial height H of the vane 12 between the inner plate 16 and the outer plate 18, providing a fluid flow connection between a fluid inlet 25a and a fluid outlet 25b. In this example, the fluid inlets 25a and the fluid outlets 25b are all arranged in the same plate, namely the inner plate 16. In this example, the fluid inlet 25a or the fluid outlet 25b is said to be "arranged" in a plate, to indicate that the plate has at least one orifice into which the channel 24a opens out facing away from the bypass passage, this orifice being for fluid flow connection to the feed pipe 22a or to the recovery pipe 22b. Furthermore, each vane 12 or vane sector 10 includes a channel 24a. Thus, in this example, the vane sector 10 has as many channels 24a, as many inlets 25a, and as many outlets 25b (or as many branch circuits 24), as it has vanes 12.

Each inlet 25a is in fluid flow connection with a branch tapping 23a of the feed pipe 22a while each outlet 25b is in fluid flow connection with a branch tapping 23b of the recovery pipe 22b. The flow direction of the fluid in the cooling circuit 20 is shown by arrows. Each tapping 23a and 23b includes an isolating valve 26. It is thus possible to cut off the flow of oil in a channel 24a and to isolate the distribution circuit 22 totally.

While the turbojet is in operation, the channel 24a formed in each vane 12 serves to exchange heat between the hot oil flowing in that channel and the stream of cold air that surrounds each of the vanes 12. Furthermore, the two passages of the channel 24a in a vane 12 can be arranged in parallel with each other and close enough together to enable heat to be exchanged between the oil flowing in one passage in a "go" flow direction and the oil flowing in the other passage in an opposite "return" direction. In this way, the temperatures of the oil in the two passages corresponding to the opposite flow directions of oil in a branch circuit 24 can be averaged to some extent, thereby reducing the temperature differences of the oil in a given vane. Naturally, the passages may be rectilinear and/or curvilinear.

By way of example, the vane sector 10 may be constructed by an additive fabrication method using a metal, equivalent to three-dimensional (3D) printing in a metal material. The channels are thus created directly during construction of the block of material constituting the sector 10. Alternatively, the vane sector 10 may be constructed by using more conventional fabrication techniques.

In this example, the distribution circuit 22 extends circumferentially and on the inside relative to the inner plate 16. Thus, the distribution circuit 22 is arranged outside the stator vane set 9.

Figure 3:
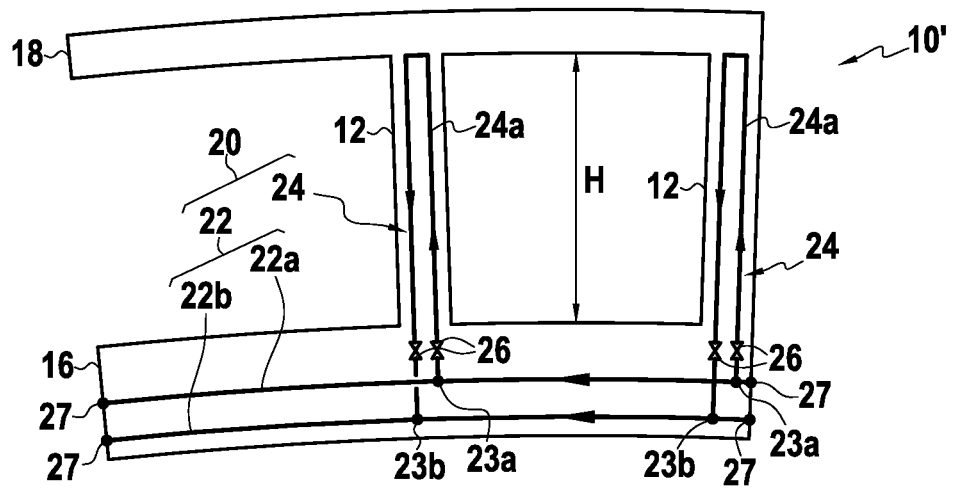
FIG. 3 shows a first variant of the first embodiment.

In a variant as shown in FIG. 3, the distribution circuit 22 is integrated in part in the vane sectors 10', in this example in the inner plate 16. The fluid inlets and outlets of the branch circuits 24 in this example coincide with the branch tappings 23a and 23b of the feed and recovery pipes of the distribution circuit 22. In this example, the portions of the feed and recovery pipes that are included in the inner plate 16 have couplings 27 enabling them to be coupled respectively to the portions of the feed and recovery pipes in adjacent vane sectors 10'. Furthermore, a branch circuit 24 may include isolating valves 26, which in this example may be housed in the thickness and/or on the radially inner surface of an inner plate 16.

In another variant, it is possible to include portions of the feed pipe only in the inner plate 16, while the recovery pipe remains arranged completely outside the stator vane set as in the embodiment described above with reference to FIG. 2, and therefore does not require couplings 27. Specifically, the temperature of the fluid flowing in the feed pipe is generally higher than the temperature of the fluid flowing in the recovery pipe. The use of the inner plates 16 to provide additional heat exchange area for the fluid is thus of greater advantage with the fluid of a feed pipe.

Figure 4:
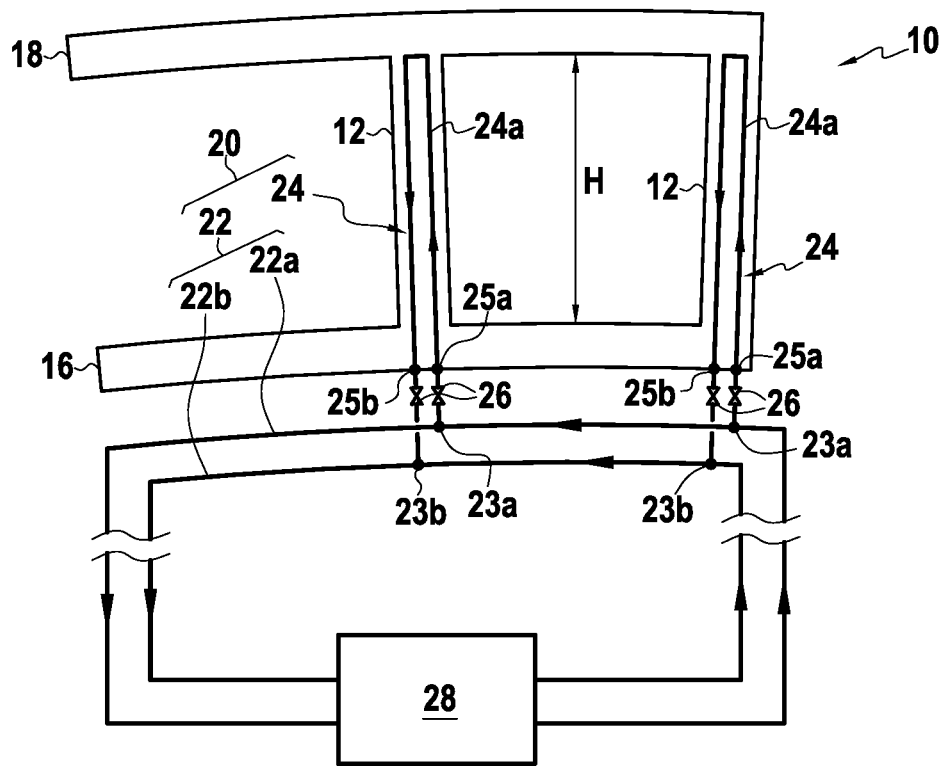
FIG. 4 shows a second variant of the first embodiment.

In yet another variant shown in FIG. 4, the fluid that flows in the cooling circuit 20 is a heat transfer fluid that exchanges heat with the oil of the turbojet 1 in a heat exchanger 28.

Figure 5:
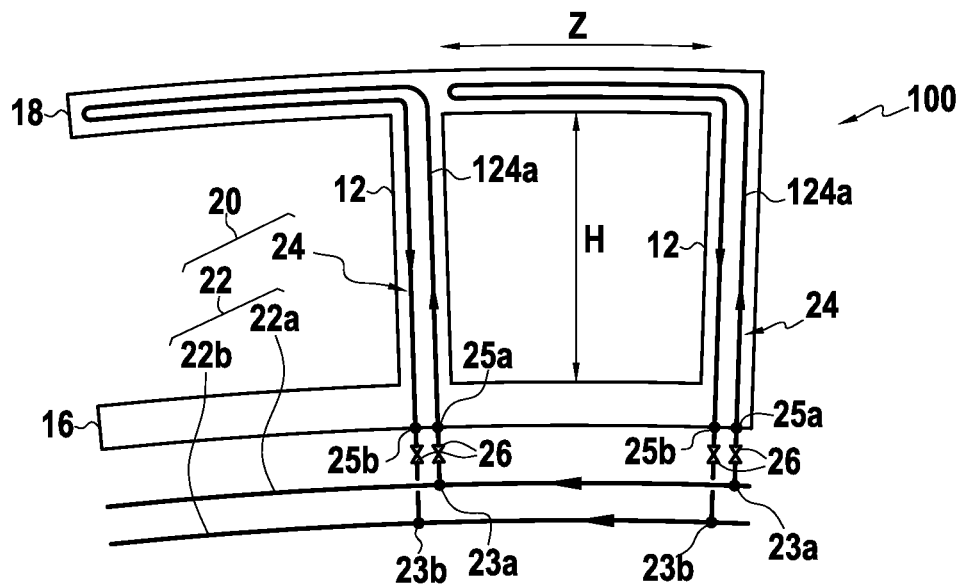
FIG. 5 is a simplified representation of a second embodiment of a vane sector.

FIG. 5 shows a second embodiment of a vane sector 100, similar to the vane sector 10 of the first embodiment with the exception of the channel of each branch circuit. Thus, elements that are identical retain the same numerical references, while elements that are modified have their reference signs increased by 100.

Each channel 124a of the vane sector 100 extends over the entire radial height H of the vanes 12 and extends into the outer plate 18 over all or part of the circumferential extent Z between vanes. Thus, in this example, the inlets and outlets 25a and 25b are arranged in a single plate, i.e. the inner plate 16, while the channel 124a extends into the other plate, namely the outer plate 18. More particularly, from a fluid inlet 25a, each channel 124a extends radially in a vane 12, circumferentially in a plate 16 over the entire circumferential extent Z between vanes, and then once more radially in the same vane 12 towards the fluid outlet 25b.

The inlets and outlets 25a and 25b of a branch circuit 24 need not necessarily be arranged in line with the vane 12 in which the branch circuit extends. In a variant, it is possible to arrange the inlets and outlets 25a and 25b still in the inner plate 16, but in the vicinity of a vane 12 that is adjacent to the vane in which the branch circuit extends. In this way, the channel 124a presents a portion that extends in the inner plate and that connects with the portion of the same channel that extends in the vane. The inner plate 16 is thus also used for heat exchange between the fluid of a branch circuit 24 and the air passing through the vane sector. This principle may be applied to a branch circuit having its channel extending through more than one vane, as described below with reference to FIG. 6.

In another variant, the inner plate 16 may have integrated therein portions of the feed pipe of the distribution circuit together also with portions of the recovery pipe, in the same manner as described above with reference to FIG. 3.

In another variant on the basis of the above-mentioned embodiments of a vane sector described with reference to FIG. 5, it is possible to split the vane sector 100 that has two vanes into two vane sectors each having a single vane, which vane sectors are arranged next to each other, while conserving the same fluid flow circuit.

With reference to the diagram of FIG. 5, physical separation between the two vane sectors takes place in each inner and outer plate 16 and 18 at one end of the circumferential extent between the vanes. It can thus be understood that for at least one of the vane sectors of the set 9, a first end of the outer plate of the vane sector is next to a second end of the outer plate of an adjacent vane sector, said second end being situated radially in line with a vane. This configuration may be adopted for all or nearly all of the vane sectors of the set 9. The sectors having one vane as made in this way can be fastened to one another by conventional fastener means.

With such an embodiment, if one or more vanes are damaged in flight, e.g. by impacts against a foreign object, it suffices to replace the corresponding vane sector(s) in order to reconstitute a stator vane set 9 for the turbojet. In other words, only damaged vanes need to be replaced.

In general manner, the number of vanes in a vane sector is preferably less than or equal to six. Specifically, a large number of vanes implies higher cost for the vane sector, and thus has an incidence on the cost of replacing a damaged vane since it is necessary to change the entire corresponding vane sector. Furthermore, if the branch circuit of the vane sector has a single channel that extends through all of the vanes of the sector as described below with reference to FIG. 6, then the loss of head in the branch circuit is greater than it would be with a plurality of branch circuits in parallel in the same vane sector, as described above with reference to FIG. 5. A large loss of head in the branch circuit requires a large pressure difference in the fluid between the feed pipe and the recovery pipe in order to maintain the desired flow rate of fluid through the vanes, and that implies that the fluid becomes heated, which is generally undesirable.

Conversely, selecting vane sectors having only one vane is not necessarily optimal, in particular because of the additional weight involved in the fastener means between adjacent vane sectors. Furthermore, since under such circumstances there are as many branch circuits as there are vanes, the number of isolating valves 26 (assuming there are two valves per branch circuit) can become penalizing in terms of cost, extra weight, monitoring, and maintenance.

For these reasons, the number of vanes in a vane sector may preferably lie in the range two to four.

Figure 6:
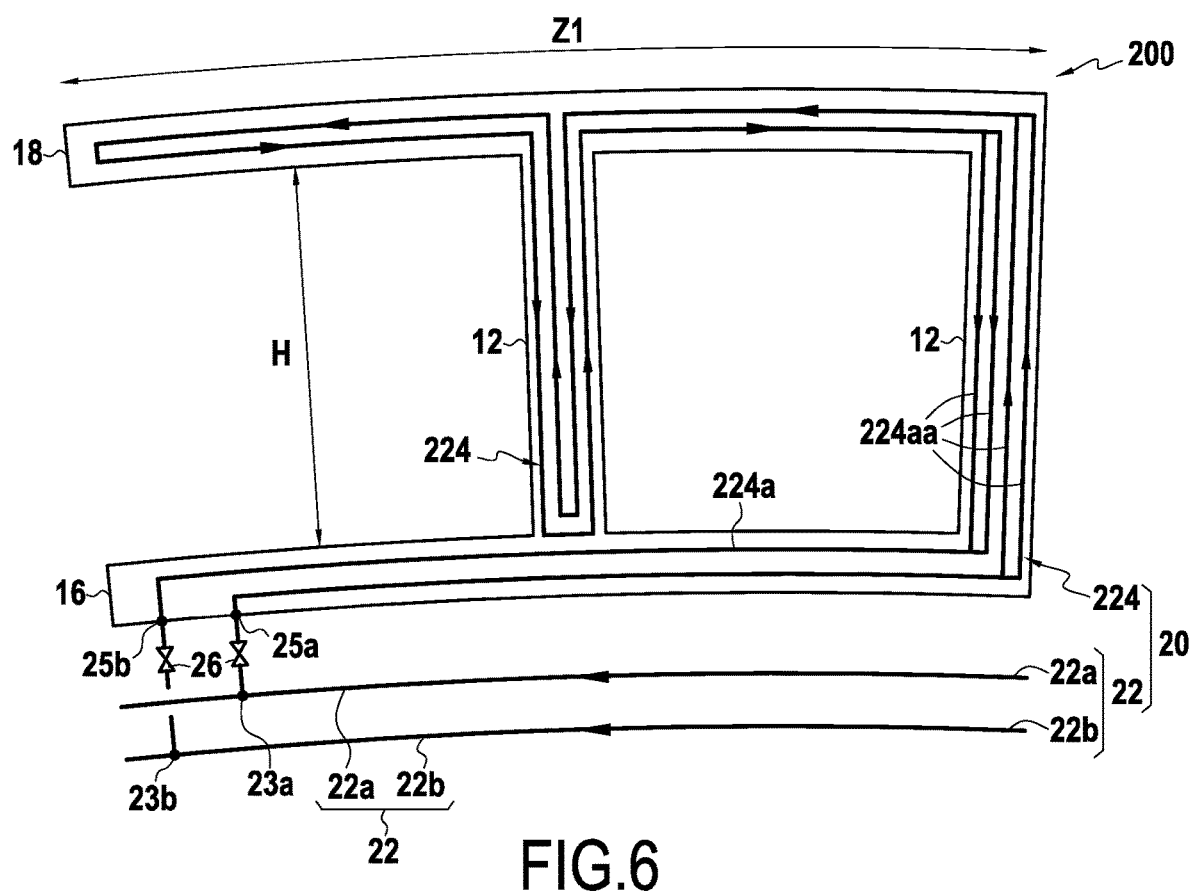
FIG. 6 is a simplified representation of a third embodiment of a vane sector.

FIG. 6 shows a third embodiment of a vane sector 200, similar to the vane sector 10 of the first embodiment with the exception of the branch circuit. Thus, elements that are identical conserve the same numerical reference while elements that are modified have their reference signs incremented by 200.

The branch circuit 224 has a single channel 224a that extends in two vanes 12. The channel 224a extends over the entire radial height H of each of the vanes 12, and also in the inner and outer plates 16 and 18, and does so over substantially the entire circumferential extent Z1 of the vane sector 200. In this example, the vane sector 200 has only one branch circuit 224. More particularly, from the fluid inlet 25a, the channel 224a extends radially in a first vane 12, circumferentially in an outer plate 18 over the entire circumferential extent Z1 of the vane sector 200, then radially once again in the first vane 12 towards the fluid outlet 25b. In this example, the channel 224a also extends radially in the second vane 12.

In order to make uniform the diffusion of heat from the hot fluid in the various vanes 12, the channel 224a is subdivided into two channels 224aa in the vane 12 first passed through by the channel 224a in question in the flow direction of the fluid within the channel 224a from upstream to downstream from the inlet 25a towards the outlet 25b, with this happening each time the channel 224a passes through the vane 12. Thus, each vane 12 presents an identical number of passages for the channel 224a, in this example four passages.

The inlets and outlets 25a and 25b of the branch circuit 224 are arranged in the inner plate 16 close to a circumferential end of the plate that is remote from the vane 12 where the channel 224a branches from the inner plate 16 to the vane 12. In this way, the inner plate 16 is used over practically all of its circumferential extent for exchanging heat between the fluid of the branch circuit 224 and the air passing through the vane sector.

Figure 7:
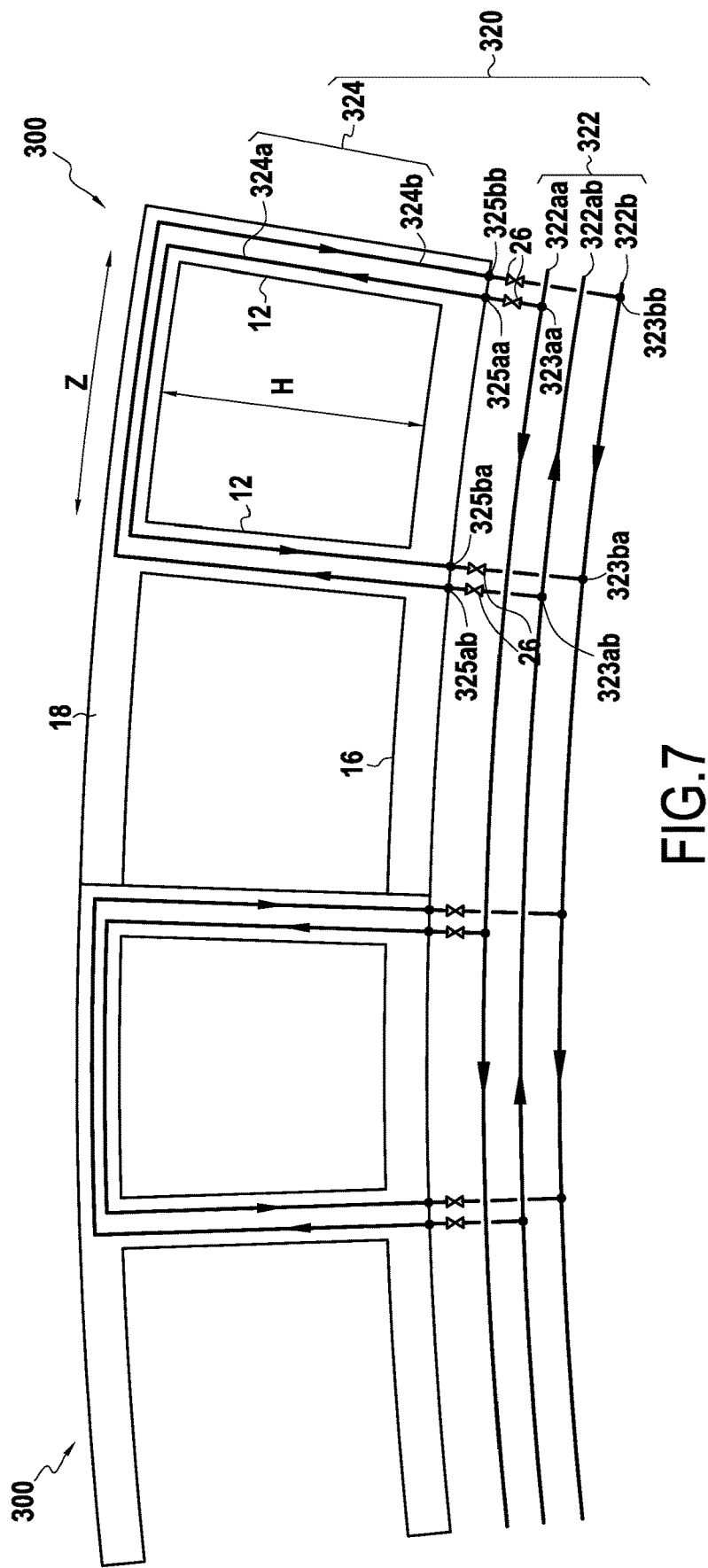
FIG. 7 is a simplified representation of a fourth embodiment of a vane sector.

FIG. 7 shows a fourth embodiment of a vane sector 300, similar to the vane sector 10 of the first embodiment, with the exception of the branch circuit and of the distribution circuit. Thus, elements that are identical conserve the same numerical references while elements that are modified have their reference signs incremented by 300. It should be observed that FIG. 7 shows two adjacent vane sectors 300.

In this example, a cooling circuit 320 comprises a distribution circuit 322 and a branch circuit 324. The distribution circuit 322 has a first feed pipe 322aa, a second feed pipe 322ab, and a single recovery pipe 322b, these pipes extending circumferentially. As shown by arrows, the flow direction of the fluid within the first feed pipe 322aa is opposite to the flow direction of the fluid within the second feed pipe 322ab.

In this example, the branch circuit 324 in each vane sector 300 has two channels, namely a first channel 324a and a second channel 324b. The first channel 324a provides fluid flow connection between a first inlet 325aa and a first outlet 325ba by extending in both vanes 12 of the vane sector 300, and also in the outer plate 18. The second channel 324b provides fluid flow connection between a second inlet 325ab and a second outlet 325bb by extending in both vanes 12 of the vane sector 300, and in the outer plate 18. Thus, in this example, the first and second channels 324a and 324b extend over the entire radial height H of two adjacent vanes 12 of the vane sector 300 and over the entire circumferential extent Z of the outer plate 18 between these two adjacent vanes 12. Naturally, the first and second inlets 325aa and 325ab are respectively in fluid flow connection with the branch tappings 323aa and 323ab of the first and second feed pipes 322aa and 322ab, while the first and second outlets 325ba and 325bb are respectively in fluid flow connection with the branch tappings 323ba and 323bb of the recovery pipe 322b.

Furthermore, the first and second inlets 325aa and 325ab and the first and second outlets 325ba and 325bb are arranged in such a manner that the flow directions of the fluid within the first and second channels 324a and 324b are opposite. In this example, the first inlet 325aa and the second outlet 325bb are arranged in the circumferential direction in the vicinity of the same vane from among the two vanes 12 of the vane sector 300, while the first outlet 325ba and the second inlet 325ab are arranged in the circumferential direction in the vicinity of the other vane from among the two vanes 12 of the vane sector 300.

The flow directions of fluid firstly within the first and second feed pipes 322aa and 322ab, and secondly within the first and second channels 324a and 324b serve to obtain great temperature uniformity firstly within each vane sector 300 and secondly within each of the vane sectors 300 making up the vane set 9 of the turbojet 1. In order to obtain such temperature uniformity, it is advantageous for the first and second feed pipes 322aa and 322ab to be arranged parallel to each other and sufficiently close together to enable heat to be exchanged between the fluids flowing in the two pipes. This provision is particularly advantageous in a configuration in which the fluid in each feed pipe tends to cool as it travels, as applied in particular when the first and second feed pipes are arranged in the inner plate 16 in order to exchange heat with the air in the passage. It is also preferable for the fluid temperatures respectively at the inlets of the first and second feed pipes to be substantially the same. Mutual heat exchange between the fluid flowing in the second pipes in opposite flow directions serves to average out the temperatures of the fluid in these two pipes, and consequently to obtain a relatively uniform temperature for the fluid between the respective inlets 325aa and 325ab of the branch circuits 324 of the various vane sectors 300.

Figure 8:
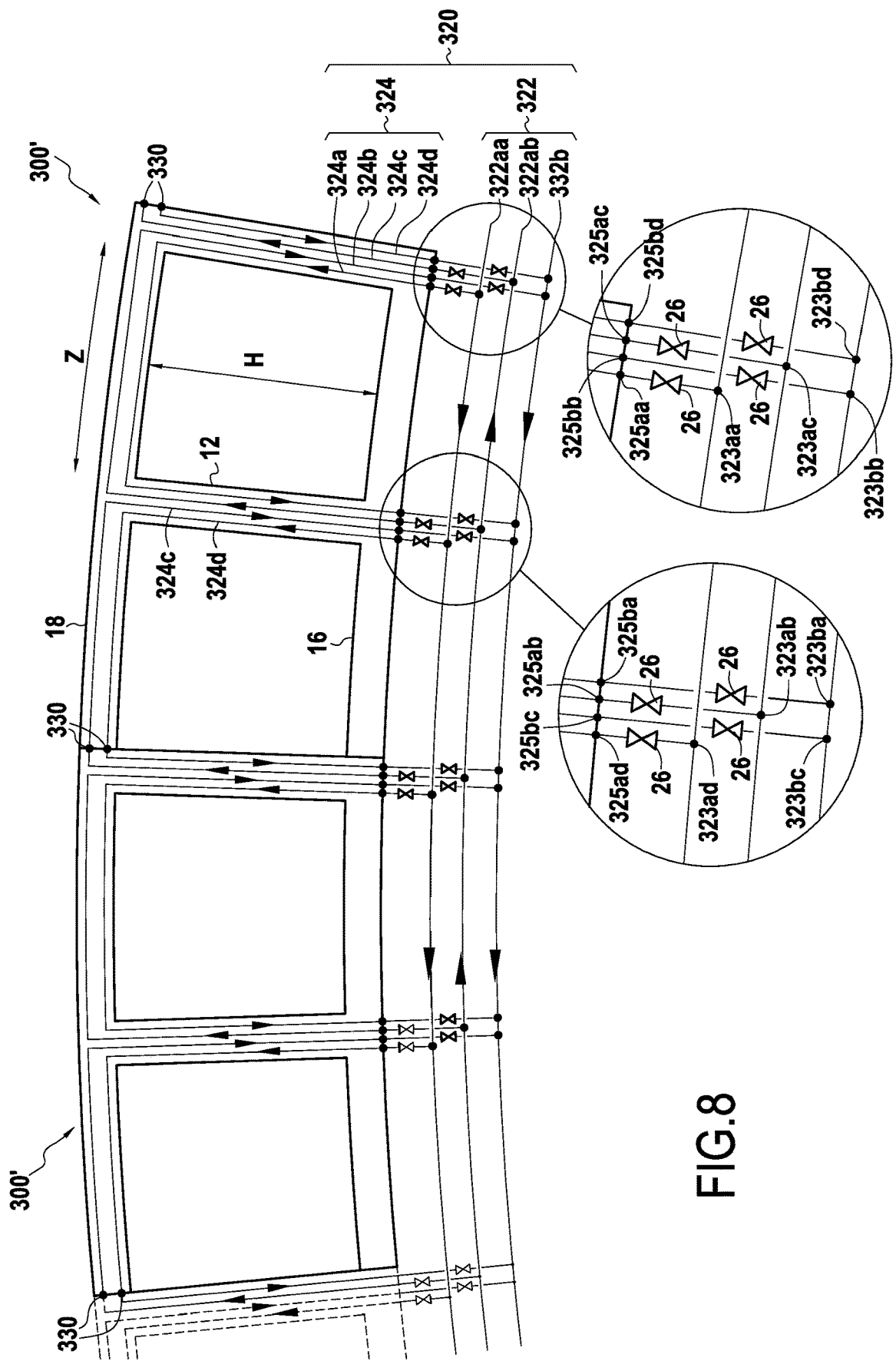
FIG. 8 shows a variant of the fourth embodiment.

In a variant shown in FIG. 8, to further improve the uniformity of temperature in each vane sector 300', third and fourth channels 324c and 324d extend in two adjacent vane sectors 300'. It can thus be understood that each vane sector 300' comprises two distinct third channel portions and two distinct fourth channel portions, the two third channel portions and the two fourth channel portions belonging respectively to two third channels and to two fourth channels that are distinct.

These third and fourth channels 324c and 324d extend in each of the vane sectors 300' over the entire radial height H of a vane 12. Furthermore, these third and fourth channels 324c and 324d extend over the entire circumferential extent of the outer plate 18 of one of the two adjacent vane sectors 300' between the two adjacent vanes 12 belonging respectively to the two distinct adjacent vane sectors 300'. Thus, the third and fourth channels 324c and 324d have couplings 330 to provide fluid flow continuity between two adjacent vane sectors 300'. These third and fourth channels 324c and 324d respectively provide fluid flow connection between a third inlet 325ac and a third outlet 325bc and a fourth inlet 325ad with a fourth outlet 325bd. The third and fourth inlets 325ac and 325ad and the third and fourth outlets 325bc and 325bd are arranged in such a manner that the flow directions of the fluid within the third and fourth channels 324c and 324d are opposite. Naturally, the third and fourth inlets 325*ac* and 325*ad* are respectively in fluid flow connection with the branch tappings 323*ac* and 323*ac* of the first and second feed pipes 322*aa* and 322*ab*, while the third and fourth outlets 325*bc* and 325*bd* are respectively in fluid flow connection with the branch tappings 323*bc* and 323*bd* of the recovery pipe 322*b*.

Naturally, in another variant that is not shown, the first and second feed pipes 322*aa* and 322*ab* and/or the recovery pipe 322*b* may be arranged at least in part in the inner plate 16 of the vane sectors 300 or 300', in similar manner to the FIG. 3 variant of the first embodiment.

Although the present invention is described with reference to specific embodiments, it is clear that modifications and changes may be undertaken on those embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive. In particular, the configurations of the channels can be combined and transposed from one embodiment, example, or variant to another.

The invention claimed is:

1. A turbomachine including at least one stator vane sector and a fluid distribution circuit, the at least one stator vane sector comprising at least one vane, a fluid inlet, a fluid outlet, and a channel providing fluid flow connection between the fluid inlet and the fluid outlet while extending at least in part in the at least one vane, the at least one vane and the channel being adapted, while the turbomachine is in operation, to enable heat to be exchanged between a hot fluid passing through the channel and a stream of cold air passing through the at least one stator vane sector, the fluid distribution circuit presenting at least one feed pipe and at least one recovery pipe distinct from the at least one feed pipe, the fluid inlet being in fluid flow connection with a branch tapping of the at least one feed pipe while the fluid outlet is in fluid flow connection with a branch tapping of the at least one recovery pipe, wherein the at least one stator vane sector comprises an inner plate connected to an inner end of the at least one vane and an outer plate connected to an outer end of the at least one vane, the fluid inlet and the fluid outlet both being arranged in the inner plate, and the channel extending in part in the outer plate.

2. The turbomachine according to claim 1, wherein, from the fluid inlet, the channel extends radially in a first vane of the at least one vane, circumferentially in the outer plate over an entire circumferential extent of the at least one stator vane sector, and then once more radially in the first vane towards the fluid outlet.

3. The turbomachine according to claim 1, wherein:
the at least one vane of the at least one stator vane sector includes a plurality of vanes; and
the channel extends radially from the fluid inlet in a first vane of the plurality of vanes, circumferentially in the outer plate over an entire circumferential extent between the first vane and an adjacent vane of the plurality of vanes, then once more radially in the first vane towards the fluid outlet.

4. The turbomachine according to claim 1, wherein the at least one vane of the at least one stator vane sector has a plurality of vanes, the channel extending in at least two vanes of the plurality of vanes.

5. The turbomachine according to claim 4, wherein the inner plate is connected to the inner end of each of the vanes of the plurality of vanes and the outer plate is connected to the outer end of each of the vanes of the plurality of vanes, the channel extending in the inner plate and in the outer plate.

6. The turbomachine according to claim 1, wherein the at least one vane of the at least one stator vane sector has a plurality of vanes, at least two vanes of the plurality of vanes each having a respective channel, the at least two vanes of the plurality of vanes and the respective channels being adapted, when the turbomachine is in operation, to enable heat to be exchanged between the hot fluid flowing through the respective channel and the cold air stream flowing through the at least one stator vane sector, the respective channel of one vane of the at least two vanes of the plurality of vanes being distinct from the respective channel of another vane of the at least two vanes of the plurality of vanes, the at least one stator vane sector having as many fluid inlets and fluid outlets as the at least one stator vane sector has channels, each channel being respectively in fluid flow connection with a fluid inlet and with a fluid outlet that are distinct from the fluid inlet and the fluid outlet of each other channel.

7. The turbomachine according to claim 1, wherein the at least one stator vane sector includes at least two stator vane sectors, the fluid inlet of each stator vane sector being in fluid flow connection with a branch tapping of the at least one feed pipe, while the fluid outlet of each vane sector is in fluid flow connection with a branch tapping of the at least one recovery pipe.

8. The turbomachine according to claim 7, wherein each of the at least two stator vane sectors is removable from the turbomachine independently of each other.

9. The turbomachine according to claim 1, wherein the at least one feed pipe forms a first feed pipe while the channel, the fluid inlet, and the fluid outlet form respectively a first channel, a first fluid inlet, and a first fluid outlet, the distribution circuit comprising a second feed pipe, a first flow direction of the fluid in the first feed pipe being opposite to a second flow direction of the fluid in the second feed pipe, while the at least one stator vane sector includes a second fluid inlet, a second fluid outlet, and a second channel providing fluid flow connection between the second fluid inlet and the second fluid outlet while extending at least in part in the at least one vane, the at least one vane and the second channel being adapted, when the turbomachine is in operation, to allow heat to be exchanged between the hot fluid flowing through the second channel and the cold air stream flowing through the at least one stator vane sector, the second fluid inlet being in fluid flow connection with a branch tapping of the second feed pipe, while the second fluid flow outlet is in fluid flow connection with a branch tapping of the at least one recovery pipe.

10. The turbomachine according to claim 1, wherein the fluid distribution circuit is arranged at least in part in one of the plates from among the inner plate and the outer plate.

11. The turbomachine according to claim 1, wherein the branch tapping of the at least one feed pipe and/or the branch tapping of the at least one recovery pipe is/are provided with an isolating valve.

12. The turbomachine according to claim 1, wherein the hot fluid is a liquid.

13. The turbomachine according to claim 1, wherein the hot fluid is a heat transfer fluid, and wherein the distribution circuit includes a heat exchanger configured to exchange heat between the heat transfer fluid and another fluid.

14. The turbomachine according to claim 1, wherein a number of vanes of the at least one stator vane sector lies in a range two to four.

15. The turbomachine according to claim 1, wherein:
the at least one stator vane sector further comprises at least two dependent branch circuits in parallel;
each dependent branch circuit including a fluid inlet, a fluid outlet, and a channel;
the fluid inlet of each dependent branch circuit is in fluid flow connection with a different branch tapping of the at least one feed pipe; and
the fluid outlet of each dependent branch circuit is in fluid flow connection with a different branch tapping of the at least one recovery pipe.

16. A turbomachine, comprising:
a fluid distribution circuit, including:
   at least one feed pipe; and
   at least one recovery pipe separate from the at least one feed pipe;
a plurality of stator vane sectors, each stator vane sector respectively including:
   an inner plate;
   an outer plate;
   at least one vane having an inner end connected to the inner plate and an outer end connected to the outer plate;
   a fluid inlet in fluid flow connection with a respective branch tapping of the at least one feed pipe;
   a fluid outlet in fluid flow connection with a respective branch tapping of the at least one recovery pipe; and
   a channel that fluidically connects the fluid inlet and the fluid outlet, that extends at least in part in the at least one vane, and that is configured to exchange heat between a hot fluid passing through the channel and a stream of cold air passing through the stator vane sector, wherein:
      both of the fluid inlet and the fluid outlet are arranged in one of the inner plate and the outer plate; and
      the channel further extends, at least in part, in an other of the inner plate and the outer plate;
wherein each stator vane sector is removable from the turbomachine independently of each other.

17. The turbomachine of claim 16, wherein:
the at least one vane of each stator vane sector of the plurality of stator vane sectors respectively includes a plurality of vanes, each vane of the plurality of vanes of each stator vane sector respectively having an inner end connected to the inner plate and an outer end connected to the outer plate; and
for each pair of adjacent vanes of the plurality of vanes of each stator vane sector, the channel extends one of radially inward and radially outward through a first vane of the pair, circumferentially in one of the inner plate and the outer plate over a circumferential extent between the pair, and an other of the radially inward and radially outward through a second vane of the pair.

18. The turbomachine of claim 16, wherein:
each stator vane sector further respectively includes:
   a further fluid inlet in fluid flow connection with a respective branch tapping of the at least one feed pipe;
   a further fluid outlet in fluid flow connection with a respective branch tapping of the at least one recovery pipe; and
   a further channel that fluidically connects the fluid inlet and the fluid outlet, that extends at least in part in the at least one vane, and that is configured to exchange heat between the hot fluid passing through the channel and the stream of cold air passing through the stator vane sector; and
the channel and the further channel are configured so as to have opposite flow directions.

19. The turbomachine of claim 18, wherein:
the at least one feed pipe includes a first feed pipe with a first flow direction and a second feed pipe with a second flow direction opposite to the first flow direction;
the first feed pipe is in fluid communication with the fluid inlet; and
the second feed pipe is in fluid communication with the further fluid inlet.

20. The turbomachine according to claim 16, wherein the hot fluid is a liquid.

* * * * *